United States Patent
Park et al.

(10) Patent No.: US 10,008,937 B1
(45) Date of Patent: Jun. 26, 2018

(54) APPARATUS FOR CONTROLLING DC LINK VOLTAGE IN POWER CELL OF MEDIUM-VOLTAGE INVERTER

(71) Applicants: LSIS CO., LTD., Gyeonggi-do (KR); Seoul National University R&DB FOUNDATION, Seoul (KR)

(72) Inventors: Jong-Je Park, Gyeonggi-do (KR); Seung-Ki Sul, Seoul (KR); Jeong-Mock Yoo, Gyeonggi-do (KR); Hyun-Sam Jung, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/800,167

(22) Filed: Nov. 1, 2017

(30) Foreign Application Priority Data

Dec. 26, 2016 (KR) .......................... 10-2016-0179435

(51) Int. Cl.
| | |
|---|---|
| *H02J 1/00* | (2006.01) |
| *H02M 3/158* | (2006.01) |
| *H02M 3/155* | (2006.01) |
| *H02M 1/12* | (2006.01) |
| *H02M 7/48* | (2007.01) |
| *H02M 3/28* | (2006.01) |
| *H02M 1/42* | (2007.01) |

(52) U.S. Cl.
CPC ......... *H02M 3/1584* (2013.01); *H02M 1/126* (2013.01); *H02M 1/4208* (2013.01); *H02M 3/155* (2013.01); *H02M 3/28* (2013.01); *H02M 7/48* (2013.01)

(58) Field of Classification Search
CPC ......... H02M 3/1584; H02M 3/22; H02M 3/24
See application file for complete search history.

(56) References Cited

U.S. PATENT DOCUMENTS

| | | | |
|---|---|---|---|
| 9,369,043 B2 | 6/2016 | Couleur et al. | |
| 2014/0028237 A1* | 1/2014 | Park | ........................ H02P 27/06 318/504 |

FOREIGN PATENT DOCUMENTS

| | | |
|---|---|---|
| JP | 2009-142028 A | 6/2009 |
| JP | 5478536 B2 | 4/2014 |
| JP | 5979472 B2 | 8/2016 |

OTHER PUBLICATIONS

2016 IEEE 8th International Power Electronics and Motion Control Conference—ECCE Asia IPEMC 2016—ECCE Asia, May 22-25, 2016, Platinum Hanjue Hotel, City of Hefei, China.

* cited by examiner

*Primary Examiner* — Adolf Berhane
*Assistant Examiner* — Afework Demisse
(74) *Attorney, Agent, or Firm* — K&L Gates LLP (57) ABSTRACT

Disclosed herein is an apparatus for controlling DC link voltage in power cells of a medium-voltage inverter. The apparatus controls DC link voltage in single-phase I/O power cells in the medium-voltage inverter, by way of using a first average power based on a positive sequence voltage and a positive sequence current to output a first DC link voltage reference for controlling the average value of the DC link voltages, and using a second average power based on a negative sequence voltage and a positive sequence current or a positive sequence voltage and a negative sequence current to output a second DC link voltage reference for controlling an interphase DC link voltage.

10 Claims, 9 Drawing Sheets

APPARATUS FOR CONTROLLING DC LINK VOLTAGE IN POWER CELL OF MEDIUM-VOLTAGE INVERTER

CROSS-REFERENCE TO RELATED APPLICATIONS

This application claims the priority of Korean Patent Application No. 10-2016-0179435 filed on Dec. 26, 2016, in the Korean Intellectual Property Office, the content of which is incorporated herein by reference in its entirety.

BACKGROUND

1. Technical Field

The present disclosure relates to an apparatus for controlling DC link voltage in power cells of a medium-voltage inverter.

2. Description of the Related Art

Typically, a medium-voltage inverter refers to an inverter in which a RMS value of an input line-to-line voltage is equal to 600 V or higher. The rated power capacity varies from several hundred kW to several tens of MW. Medium-voltage inverters are commonly used in applications such as fans, pumps, and compressors.

Such medium-voltage inverters are usually implemented with multi-level inverters that outputs voltages of three or more levels. In particular, a cascaded H-bridge (CHB) inverter is frequently used. The number and magnitude of the levels of the output voltage of a CHB inverter are determined based on the number of power cells therein. The voltages input to the respective power cells are isolated from one another.

Figure 1:
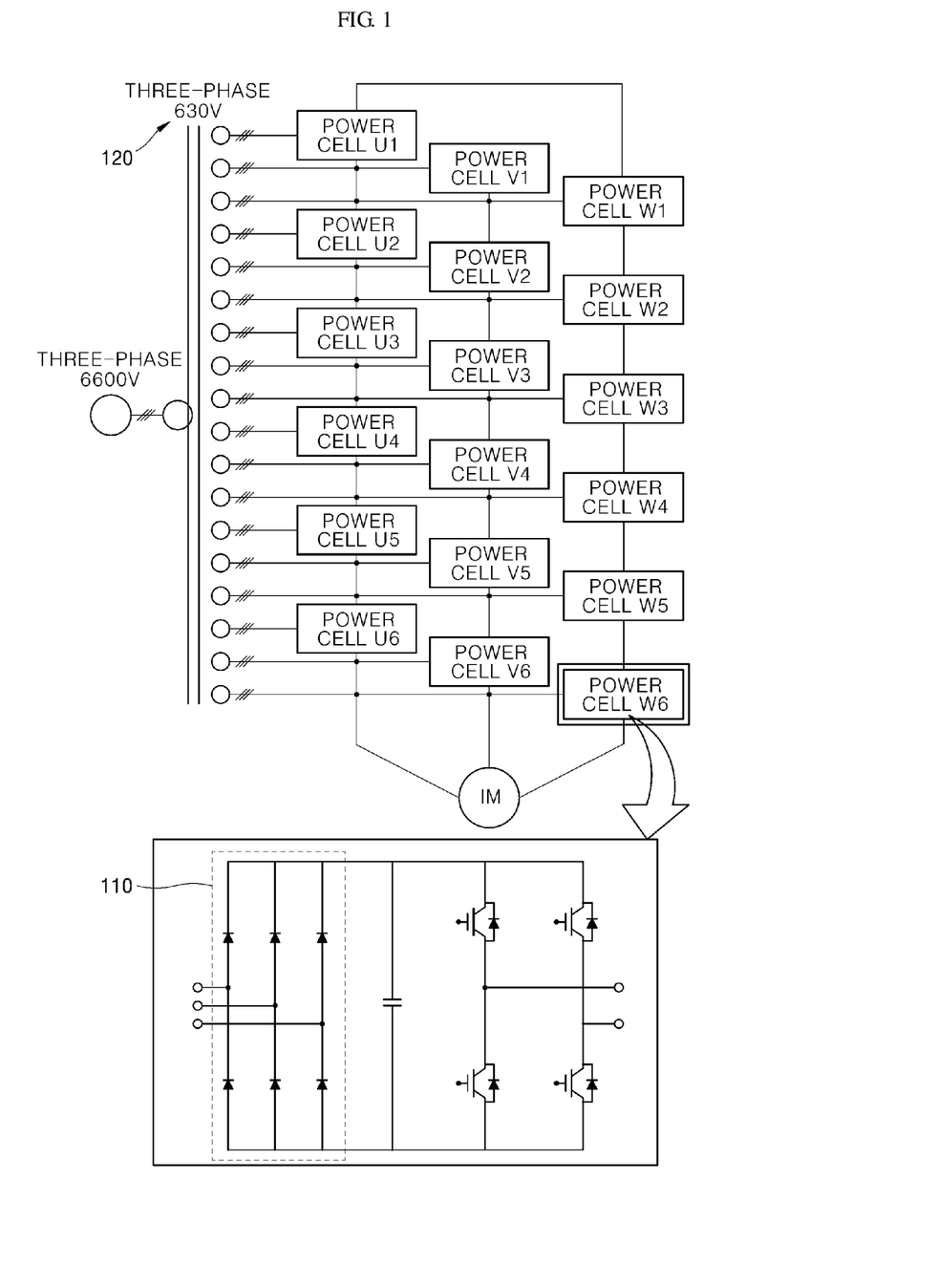
FIG. 1 is a diagram for illustrating a topology of power cells in an existing medium-voltage inverter.

FIG. 1 is a diagram for illustrating a topology of power cells in an existing medium-voltage inverter.

In the power cells of the existing medium-voltage inverter, a rectifier 110 has a diode front end configuration, and thus AC power can be converted into DC power without additional control, and the converted DC link voltage works as a voltage source for a single-phase CHB inverter. Since the power cells of such existing medium-voltage inverter has a simple configuration and is easy to control, it is most widely used as a medium-voltage inverter topology.

However, when such medium-voltage inverter having the CHB topology is applied to a load with fast acceleration/deceleration or a regenerative load, there is a problem in that unnecessary trips frequently occur since the DC link voltage control is not possible. In addition, when a diode-type rectifier circuit is applied to the power cells, there is a problem in that an expensive phase-shift transformer 120 must be applied in order to satisfy the current total harmonic distortion (THD) requirements at the input terminal of the medium-voltage inverter.

Also, the medium-voltage inverter of the CHB topology shown in FIG. 1 requires a set of up to eighteen power cells in order to output the voltage of 6,600 V. Such a large number of power cells degrade the reliability of the medium-voltage inverter itself. Moreover, there is a problem in that it increases the cost and size.

SUMMARY

It is an object of the present disclosure to provide an apparatus for controlling DC link voltage in power cells of a medium-voltage inverter that stably operates even if it is applied to a load with fast acceleration/deceleration or a regenerative load.

It is another object of the present disclosure to provide an apparatus for controlling DC link voltage in power cells of a medium-voltage inverter that can replace an expensive phase-shifting transformer with a cheap ordinary transformer.

It is yet another object of the present disclosure to provide an apparatus for controlling DC link voltage in power cells of a medium-voltage inverter with a reduced number of power cells compared to existing CHB inverters.

In accordance with one aspect of the present disclosure, an apparatus for controlling DC link voltage by outputting a DC link voltage reference in a medium-voltage inverter system comprising a plurality of power cells, each including a single-phase I/O converter stage, a smoothing stage and an inverter stage, the converter stage converting an input single-phase AC voltage into a DC voltage, the smoothing stage smoothing the DC voltage to store a DC link voltage, and the inverter stage converting the DC link voltage into AC voltage to be applied to an induction machine, comprises: a first control unit configured to output a first DC link voltage reference for controlling an average value of the DC link voltages by using a first average power based on a positive sequence voltage and a positive sequence current in an output power from the converter stage; and a second control unit configured to output a second DC link voltage reference for controlling interphase DC link voltage by using a second average power based on a negative sequence voltage and a positive sequence current or a positive sequence voltage and a negative sequence current in the output power from the converter stage, wherein a sum of the first and second DC link voltage references is output as the DC link voltage reference.

The first control unit may include: a voltage controller configured to output a positive sequence q-axis current reference by using a difference between a measured DC link average voltage and a reference DC link voltage reference; a power factor controller configured to output a positive sequence d-axis current reference by using a power factor of the input power and the positive sequence q-axis current reference output from the voltage controller; and a current controller configured to output a first DC link voltage reference by using the positive q-axis current reference and the positive sequence d-axis current reference.

The voltage controller may perform integral-proportional (IP) control on a difference between the measured DC link average voltage and the reference DC link voltage reference to output the positive sequence q-axis current reference.

The voltage controller may feed forward an estimated value of a power consumed by a load to output the positive sequence q-axis current reference.

The power factor controller may output the positive sequence d-axis current reference as a negative value in order to drive the converter stage as a leading load, or output the positive sequence d-axis current reference as a positive value in order to drive the converter stage as a lagging load.

The current controller may include: a first PI controller configured to output a positive sequence d-axis DC link voltage reference by performing proportional-integral (PI) control on a difference between the positive sequence d-axis current reference and the measured positive sequence d-axis current; a second PI controller configured to output a positive sequence q-axis DC link voltage reference by performing PI control on a difference between the positive q-axis current reference and the measured positive sequence q-axis current; and a converting unit configured to output the positive sequence d-axis DC link voltage reference and the positive sequence q-axis DC link voltage reference on a stationary reference frame as a first DC link voltage reference on a synchronous reference frame.

The second controller may include a balance controller configured to determine a second DC link voltage reference from a power reference of each phase determined by using a first energy calculated from the average DC link voltage and a second energy calculated from an actual voltage of each phase.

The second controller may further include a filter unit configured to determine the second energy by cutting off a second order harmonic component in the system and a second order harmonic component in the load from the measured DC link voltage.

The filter unit may include: a first band rejection filter configured to cut off the second order harmonic in the system from the measured DC link voltage; a second band rejection filter configured to cut off the second order harmonic in the load from the output from the first band rejection filter; and a first determining unit configured to determine an energy from the DC link voltage output from the second band rejection filter, in which the second order harmonic components in the system and the load are cut off.

The balance controller may include: a third PI controller configured to output a negative sequence power reference of each phase by performing PI control on the first energy and the second energy of each phase; and a second determining unit configured to determine a second DC link voltage reference from the negative sequence power reference of each phase.

According to an exemplary embodiment of the present disclosure, a medium-voltage inverter can stably operate even if it is applied to a load with fast acceleration/deceleration or a regenerative load In addition, according to an exemplary embodiment of the present disclosure, an expensive phase-shifting transformer can be replaced with a cheap ordinary transformer, and thus the volume of the system can be reduced and the cost for establishing the system can be saved.

Further, according to an exemplary embodiment of the present disclosure, the number of power cells can be reduced compared to existing CHB inverters, and thus the size of the system can be reduced and the cost for establishing the system can be saved.

DETAILED DESCRIPTION

Exemplary embodiments of the present disclosure will now be described in detail with reference to the accompanying drawings to facilitate understanding of the configuration and effects thereof. The scope of the present disclosure may, however, be embodied in many different forms and should not be construed as limited to the embodiments set forth herein. These embodiments are provided so that this disclosure will be thorough and complete, and will fully convey the scope of the inventive subject matter to those skilled in the art. In the drawings, the size of some of the elements may be exaggerated for convenience of illustration and not drawn on scale for illustrative purposes.

It will be understood that when an element such as a layer, region, substrate, or panel is referred to as being "on" or "connected to" another element, it can be directly on the other element or intervening elements may also be present. In contrast, when an element is referred to as being "directly on" or "directly connected to" another element, there are no intervening elements present. The same may be applied to other expressions for describing relationship between elements such as "between" and "directly between".

Terms such as first, second, etc. in the description and in the claims are used for distinguishing between similar elements and not necessarily for describing a sequential or chronological order. The terms are only used to differentiate one component from other components. For example, the terms so used are interchangeable under appropriate circumstances without departing from the scope of the present disclosure.

As used herein, the singular form of "a", "an", and "the" include plural references unless the context clearly dictates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The terms used herein, including technical terms, have the same meanings as terms that are generally understood by those skilled in the art, as long as the terms are not explicitly defined differently.

When a medium-voltage inverter system is implemented with active front end (AFE) neutral point clamped (NPC) single-phase I/O power cells as in an exemplary embodiment of the present disclosure, the current of the AC power supply can be maintained as a sinusoidal wave with a relatively low THD, and the power factor can be controlled widely from the leading to lagging power factors. In addition, it allows for bi-directional power transmission, and accordingly it can be widely used in applications requiring regenerative operation.

When a medium-voltage inverter is implemented with a conventional diode front end (DFE) power cells, it is essential to employ a phase-shifting transformer in order to satisfy the THD requirements. In contrast, in the medium-voltage inverter implemented with AFE power cells according to an exemplary embodiment of the present disclosure, an ordinary transformer can replace it. When a medium-voltage inverter employs a phase-shifting transformer, it consists of 54 taps at the secondary side and requires 18 three-phase power cells. In contrast, when a medium-voltage inverter employs an ordinary transformer, it consists of 18 taps at the secondary side and requires 9 single-phase power cells.

Unfortunately, the power cells configured in this manner has single-phase input voltage and single-phase output voltage, and thus ripple voltage of twice the input and output frequency occurs in the DC link voltage. This results in degradation in the control performance and deteriorates the reliability of the entire system. Therefore, what is required is an apparatus for controlling DC link voltage for solving the above-described problems.

Hereinafter, exemplary embodiments of the present disclosure will be described in detail with reference to the accompanying drawings.

Figure 2:
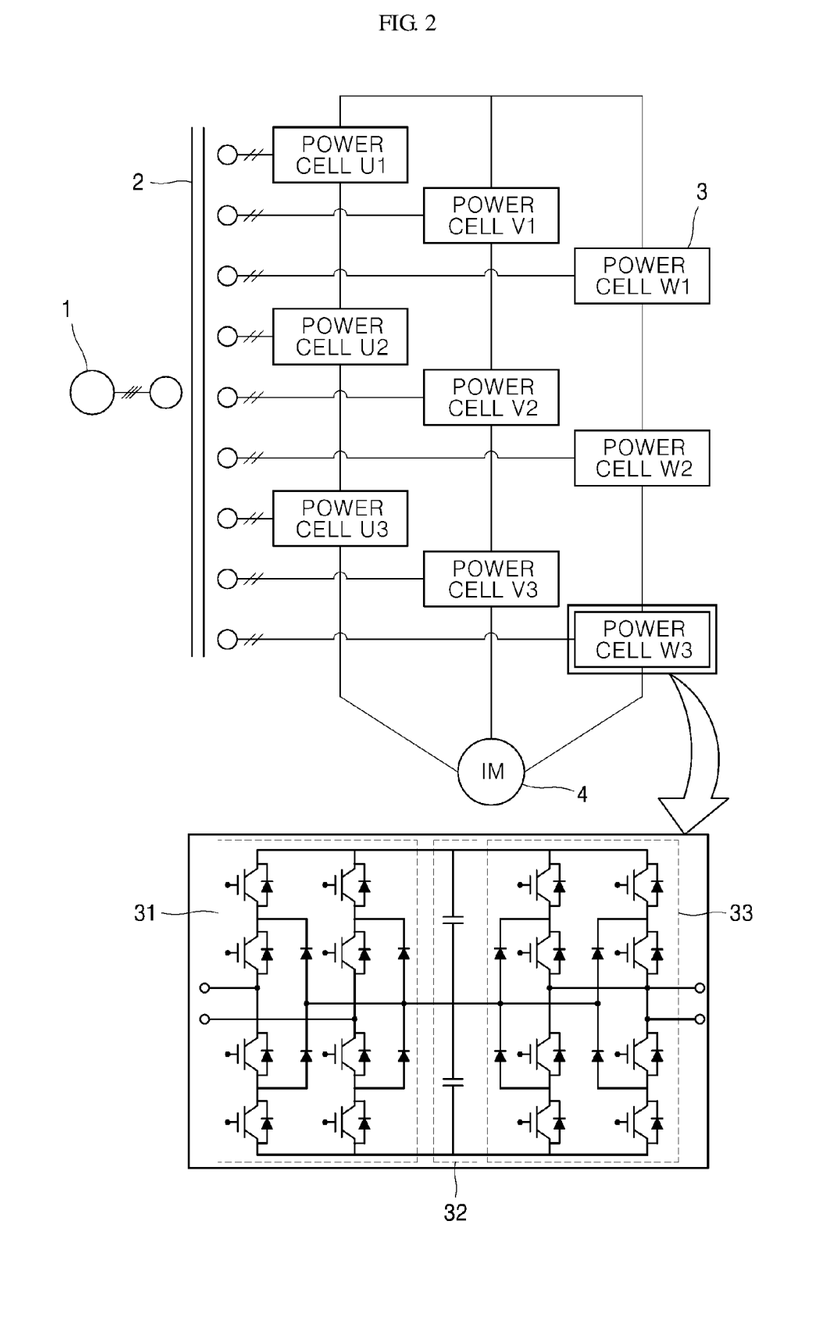
FIG. 2 is a block diagram of a medium-voltage inverter system according to an exemplary embodiment of the present disclosure.

FIG. 2 is a block diagram of a medium-voltage inverter system according to an exemplary embodiment of the present disclosure.

As shown in FIG. 2, the system may include a transformer 2 for receiving from a three-phase input power supply 1, a plurality of power cells 3, and an induction machine 4 for receiving the synchronized electric power from the plurality of power cells 3.

The transformer 2 may convert the three-phase input power into a single-phase power and provide it to each of the power cells 3. As shown in FIG. 2, each of the power cells 3 may include a neutral point clamped (NPC) converter stage 31 for receiving a single-phase AC voltage to convert it into a DC voltage, a smoothing stage 32 for smoothing the DC voltage received from the converter stage 31, and an NPC inverter stage 33 for converting the DC link voltage of the smoothing stage 33 into an AC voltage of predetermined voltage and frequency to be applied to the induction machine 4 under the control of a controller to be described below.

The power cells 3 according to the exemplary embodiment of the present disclosure are of an active front end (AFE) type. They may receive a single-phase voltage from the transformer 2 and then convert and output a single-phase voltage. When single-phase voltages are input and output, voltage ripples equal to twice the frequency of the input voltage and the frequency of the output voltage may be derived in the DC link voltage. Such ripples may disturb the DC link voltage control, and thus it is necessary filter them. The method according to the exemplary embodiment of the present disclosure is directed to controlling the DC link voltage of the smoothing stage 32 of the power cells 3 thus configured.

Figure 3:
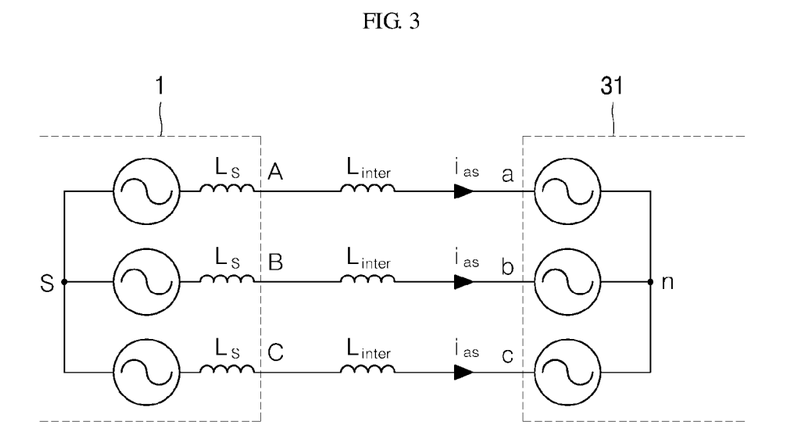
FIG. 3 is an equivalent circuit diagram of the three-phase input power supply and the converter stage shown in FIG. 2

FIG. 3 is an equivalent circuit diagram of the three-phase input power supply 1 and the converter stage 31 shown in FIG. 2.

A back-to-back single-phase boost inverter, such as a PWM boost rectifier, is widely used in applications requiring regenerative operation because it allow for bi-directional power transmission. In addition, it has advantages that it can maintain current of AC power as a sinusoidal wave with relatively low THD (total harmonic distortion), and the power factor can be controlled widely from the leading to the lagging power factors.

In FIG. 3, Ls represents the equivalent inductance inside the power supply, and $L_{inter}$ represents the inductance of an inductor added to suppress the switching current of the converter in the system.

When the three-phase AC power is rectified by the PWM boost converter stage 31, the sum of the three-phase active powers becomes the input power of the converter stage 31, and the DC link voltage can be controlled by using the input power. That is, assuming that the magnitude of the supply voltage is constant, the input power supplied from the power supply can be controlled by controlling the q-axis current on the synchronous reference frame as expressed by Equation below:

$$P_{in} = V_{as}i_{as} + V_{bs}i_{bs} + V_{cs}i_{cs} = \quad \text{[Equation 1]}$$
$$\frac{2}{3}(e_q^s i_q^s + e_d^s i_d^s) = \frac{2}{3}(e_q^e i_q^e + e_d^e i_d^e) = \frac{2}{3}E i_q^e$$

Equation 1 represents the sum of three-phase active powers of the input power supply 1, where $e_d^e$ and $e_q^e$ denote supply voltage on the synchronous reference frame, $e_{ds}^e$ and $e_{qs}^e$ denote voltage synthesized by the converter stage 31 on the synchronous reference frame, and $i_d^e$ and $i_q^e$ denote current input from the power source 1 to the converter stage 31 on the synchronous reference frame. As expressed in Equation 1, when the magnitude of the supply voltage is constant, the input power supplied from the power supply 1 can be controlled by controlling the q-axis current input to the converter stage 31.

The output voltage from the converter stage 31 is composed of a positive sequence voltage, a negative sequence voltage and a zero sequence voltage. Assuming that there is no load neutral point connection in a three-phase three-line system, no current flows between the power supply 1 and the converter stage 31, and thus it is not necessary to taking into account the zero sequence voltage.

Input power for DC link voltage control may be classified as follows:

1. First average input power generated by positive sequence voltage and positive sequence current
2. Second average input power generated by negative sequence voltage and positive sequence current, positive sequence voltage and negative sequence current
3. Third average input power generated by negative sequence voltage and negative sequence current Among these, the third average input power does not affect the DC link voltage, and thus the DC link voltage can be controlled by controlling the first and second average input powers.

Figure 4:
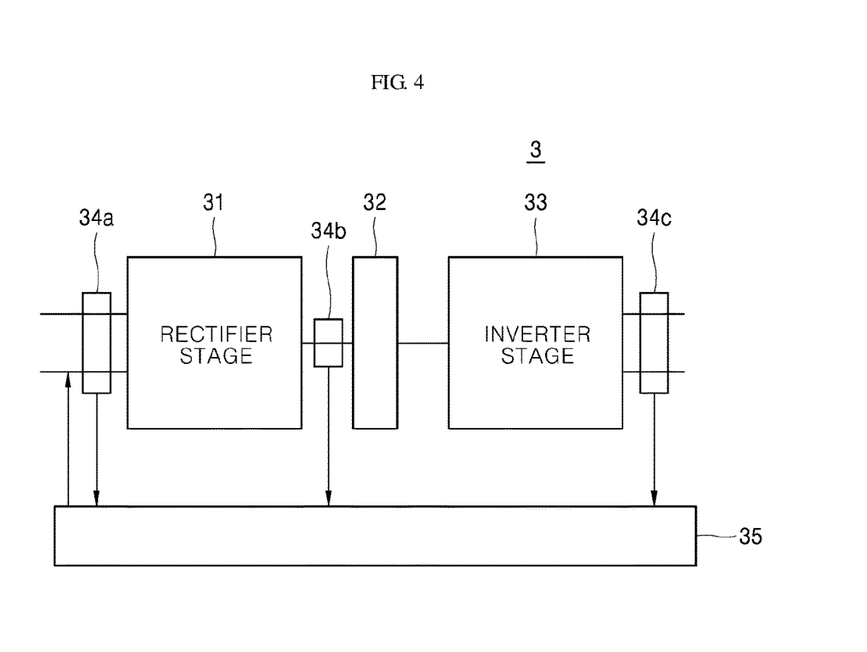
FIG. 4 is a block diagram for illustrating an apparatus for controlling DC link voltage according to an exemplary embodiment of the present disclosure.

FIG. 4 is a block diagram for illustrating an apparatus for controlling DC link voltage according to an exemplary embodiment of the present disclosure. As shown in FIG. 4, an apparatus for controlling DC link voltage 36 according to an exemplary embodiment of the present disclosure is provided for each of the power cells 3. The apparatus may receive output voltage and current from the converter stage 31 by measuring units 34a, 34b and 34c to control the DC link voltage.

Figure 5:
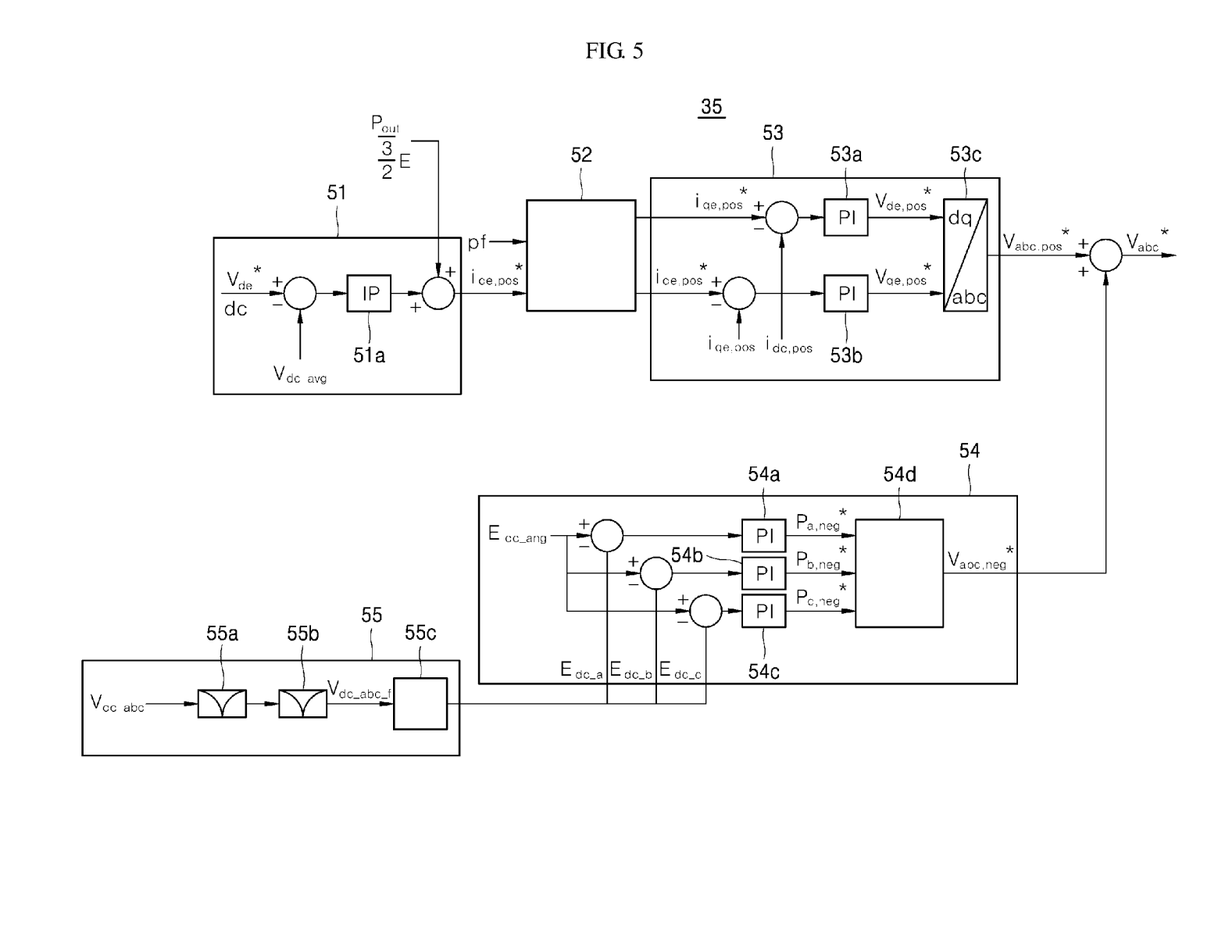
FIG. 5 is a block diagram for illustrating in detail the apparatus for controlling DC link voltage according to the exemplary embodiment of the present disclosure.

FIG. 5 is a block diagram for illustrating in detail the apparatus for controlling DC link voltage according to the exemplary embodiment of the present disclosure.

As shown in FIG. 5, the apparatus for controlling DC link voltage 35 according to an exemplary embodiment of the present disclosure may include a voltage controller 51, a power factor controller 52, a current controller 53, an interphase DC link voltage balance controller 54, and a filter unit 55. The voltage controller 51, the power factor controller 52 and the current controller 53 are for controlling the three-phase DC link voltage using the first average input power generated by the positive sequence voltage and the positive sequence current. The interphase DC link voltage balancing controller 54 and the filter unit 55 are for controlling the interphase DC link voltage using the second average input power generated by the negative sequence voltage and the positive sequence current, the positive sequence voltage and the negative sequence current. That is, the outputs from the voltage controller 51, the power factor controller 52 and the current controller 53 are positive sequence DC link voltage references, while the outputs from the interphase DC link voltage balance controller 54 and the filter unit 55 are negative sequence DC link voltage references. Accordingly, the sum of the positive sequence DC link voltage reference and the negative sequence DC link voltage reference may be the DC link voltage reference according to the exemplary embodiment of the present disclosure.

The voltage controller 51 may output a q-axis current reference for controlling the average value of all the three-phase DC link voltages using the first average input power based on the positive sequence voltage and the positive sequence current.

Figure 6:
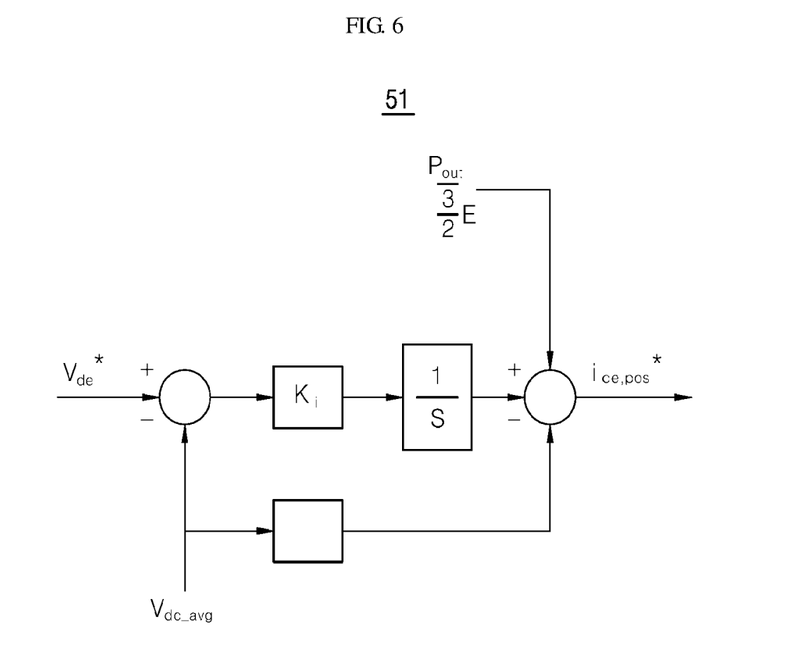
FIG. 6 is a block diagram for illustrating in detail the voltage controller shown in FIG. 5.

FIG. 6 is a block diagram for illustrating in detail the voltage controller of FIG. 5. Specifically, FIG. 6 shows the configuration of an integral proportional (IP) controller 51a in the voltage controller 51 of FIG. 5.

The voltage controller 51 may output the positive sequence q-axis current reference by IP-controlling the difference between the three-phase DC link average voltage and the reference DC link voltage reference. The q-axis current reference may be used to improve the dynamic characteristics of the control by compensating the estimated value of the power consumed by a load on the feedback by the error of the DC link voltage. The IP controller 51a is to prevent the overshoot of the three-phase DC average voltage.

The power factor controller 52 is to control the d-axis current reference. Usually, the power factor of the input power supply 1 is controlled to 1, the d-axis current reference is controlled to be 0. However, sometimes the power factor of the AC power source has to be controlled. Accordingly, the power factor controller 52 according to the exemplary embodiment of the present disclosure may use the power factor of the input power supply 1 to output the negative d-axis current reference so that the converter stage 31 acts as a capacitive load and in turn acts as a leading load, or to output the positive d-axis current reference so that the converter stage 31 acts as an inductive load and in turn acts as a lagging load.

The current controller 53 may output the positive sequence voltage reference from the positive sequence d-axis current reference and q-axis current reference, which are the outputs from the power factor controller 52.

The proportional integral (PI) controller 53a may PI-control the difference between the positive sequence d-axis current reference and the positive sequence d-axis current measured by the measuring unit 34a, to output the positive sequence d-axis DC link voltage reference on the stationary reference frame. In addition, the proportional integral (PI) controller 53a may PI-control the difference between the positive sequence q-axis current reference and the positive sequence q-axis current measured by the measuring unit 34a, to output the positive sequence q-axis DC link voltage reference on the stationary reference frame.

A converting unit 53c may convert the positive sequence d-axis and q-axis DC link voltage references on the stationary reference frame into a positive sequence DC link voltage reference on the synchronous reference frame to output it.

In this manner, the positive sequence DC link voltage reference may be outputted by the voltage controller 51, the power factor controller 52 and the current controller 53.

On the other hand, since the sum of the three phases of the average input power generated by the negative sequence component is zero, the sum of the total input/output powers does not change even if the reverse sequence voltage is applied. However, since the input/output power of each phase is affected, it is possible to balance the interphase DC link voltage by using it.

The interphase DC link voltage balance controller 54 may output a negative sequence DC link voltage reference from the power reference of each phase determined by using the energy calculated with the average DC link voltage and the energy calculated with the actual voltage. The PI controllers 54a, 54b, and 54c may perform PI control on the difference between the energy calculated from the average voltage and the energy calculated from the actual voltage to output the negative sequence power reference for each phase. A negative sequence voltage determining unit 54d may determine the negative sequence DC link voltage reference necessary for balancing the DC link from the negative sequence power reference for each phase.

Figure 7:
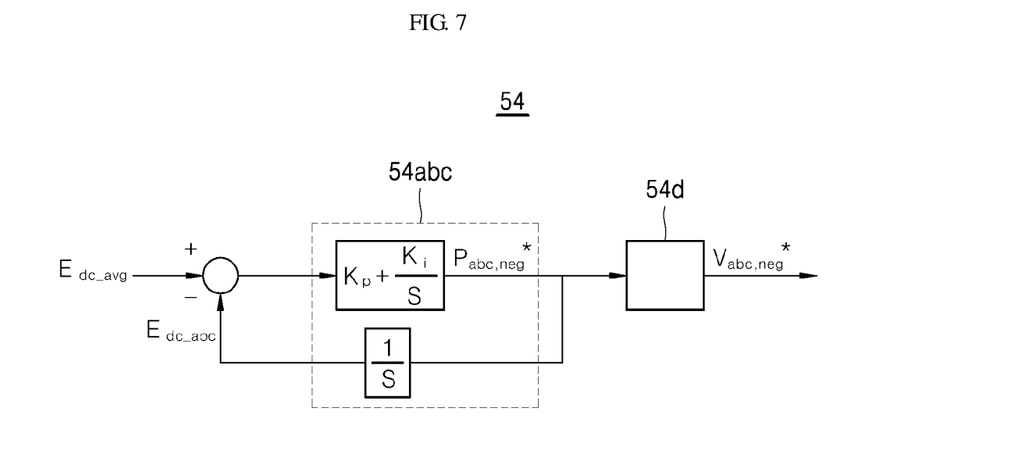
FIG. 7 is a block diagram for illustrating in detail PI controllers of the interphase DC link voltage balance controller of FIG. 5.

FIG. 7 is a block diagram for illustrating in detail the PI controllers 54a, 54b and 54c of the interphase DC link voltage balance controller 54 of FIG. 5.

As shown in FIG. 7, it is possible to output a negative sequence DC link power reference of each of the phases from the energies calculated from the average voltage and the actual voltage.

On the other hand, when a single-phase input/output system is used, a component of twice the input/output frequency is included in the DC link voltage. The second order harmonic components of the system and the load work as disturbances at the time of the balance control of the interphase DC link voltage. Therefore, the second order harmonic components of the system and the load can be removed by using the filter unit 55.

A first band rejection filter 55a of the filter unit 55 may cut off the second order harmonic of the system from the DC link voltage measured by the measuring unit 34b, and the second band rejection filter 55b may cut off the second order harmonic of the load from the output of the first band rejection filter 55a. An energy determining unit 55c may determine the energy using the DC link voltage in which the second order harmonics of the system and the load are cut off, and may provide it to the interphase DC link voltage balance controller 54.

Referring to FIG. 5, the DC link voltage reference according to an exemplary embodiment of the present disclosure can be output from the negative sequence DC link voltage reference output by the interphase DC link voltage balance controller 54 and the positive sequence DC link voltage reference output by the voltage controller 51, the power factor controller 52 and the current controller 53. This can be used for DC link voltage control of the power cells 3 of single-phase I/O system according to the exemplary embodiment of the present disclosure.

Figure 8:
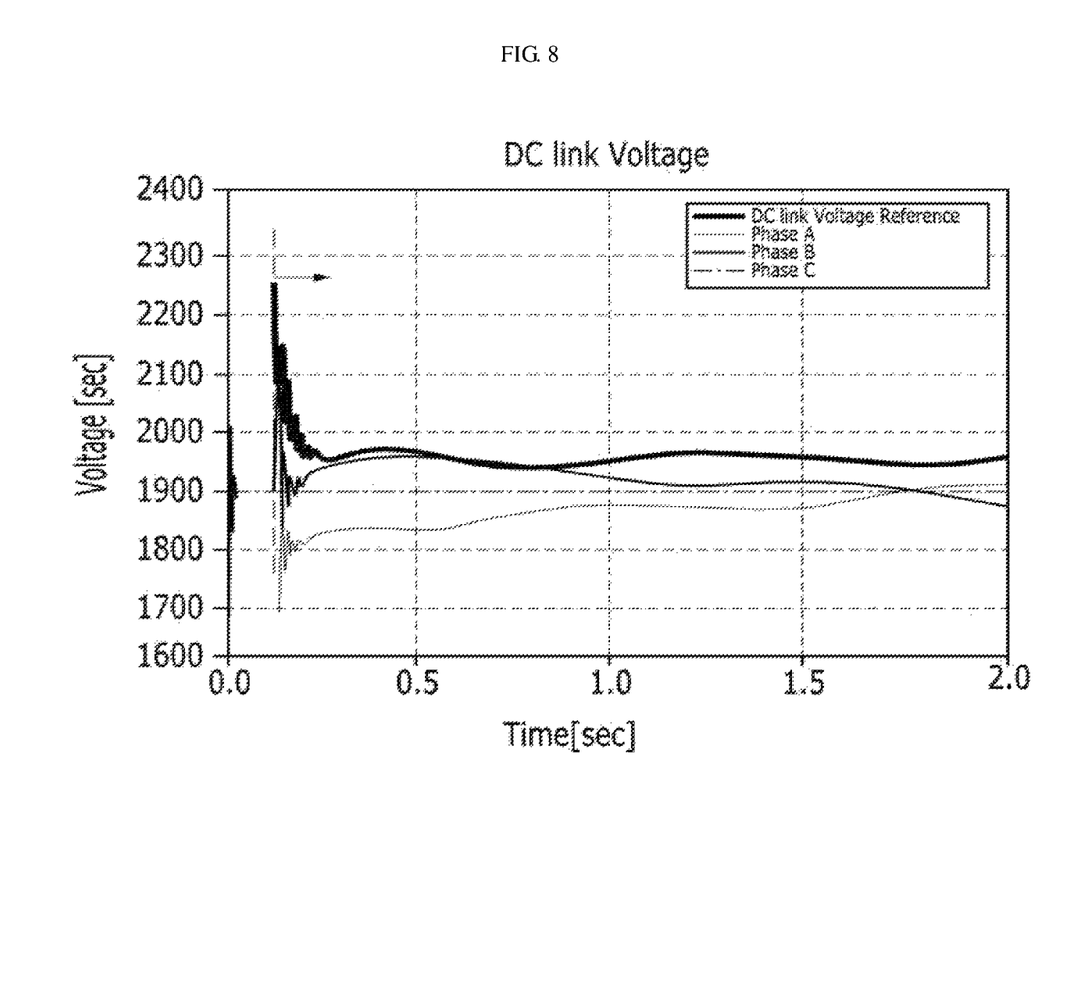
FIGS. 8 and 9 are graphs showing waveforms of the DC link voltage when only the average value DC link voltage control is performed and when the average value voltage control as well as the balance control are performed, respectively.
Figure 9:
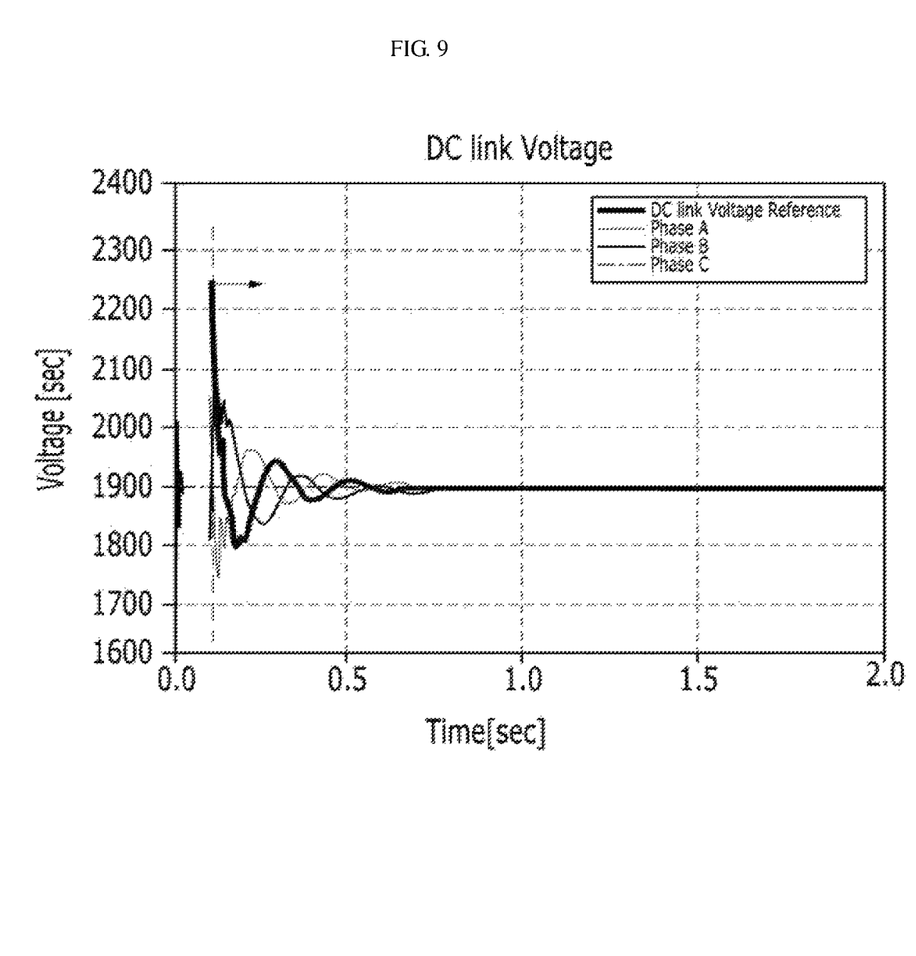

FIGS. 8 and 9 are graphs showing waveforms of the DC link voltage when only the average value voltage control is performed and when the average value voltage control as well as the balance control are performed, respectively.

As can be seen from FIGS. 8 and 9, the DC link voltage is settled more quickly when the balance control by the filter unit 55 and the interphase DC link voltage balance controller 54 is performed as well as the average value voltage control by the voltage controller 51, the power factor controller 52 and the current controller 53 (see FIG. 9) than when only the average value voltage control is performed (see FIG. 8).

Although the exemplary embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. An apparatus for controlling DC link voltage by outputting a DC link voltage reference in a medium-voltage inverter system comprising a plurality of power cells, each including a single-phase I/O converter stage, a smoothing stage and an inverter stage, the converter stage converting an input single-phase AC voltage into a DC voltage, the smoothing stage smoothing the DC voltage to store a DC link voltage, and the inverter stage converting the DC link voltage into AC voltage to be applied to an induction machine, wherein the apparatus comprises:
  a first control unit configured to output a first DC link voltage reference for controlling an average value of the DC link voltages by using a first average power based on a positive sequence voltage and a positive sequence current in an output power from the converter stage; and
  a second control unit configured to output a second DC link voltage reference for controlling interphase DC link voltage by using a second average power based on a negative sequence voltage and a positive sequence current or a positive sequence voltage and a negative sequence current in the output power from the converter stage, wherein a sum of the first and second DC link voltage references is output as the DC link voltage reference.

2. The apparatus of claim 1, wherein the first control unit comprises:
  a voltage controller configured to output a positive sequence q-axis current reference by using a difference between a measured DC link average voltage and a reference DC link voltage reference;
  a power factor controller configured to output a positive sequence d-axis current reference by using a power factor of the input power and the positive sequence q-axis current reference output from the voltage controller; and
  a current controller configured to output a first DC link voltage reference by using the positive q-axis current reference and the positive sequence d-axis current reference.

3. The apparatus of claim 2, wherein the voltage controller performs integral-proportional (IP) control on a difference between the measured DC link average voltage and the reference DC link voltage reference to output the positive sequence q-axis current reference.

4. The apparatus of claim 2, wherein the voltage controller feeds forward an estimated value of a power consumed by a load to output the positive sequence q-axis current reference.

5. The apparatus of claim 2, wherein the power factor controller outputs the positive sequence d-axis current reference as a negative value in order to drive the converter stage as a leading load, or outputs the positive sequence d-axis current reference as a positive value in order to drive the converter stage as a lagging load.

6. The apparatus of claim 2, wherein the current controller comprises:
  a first PI controller configured to output a positive sequence d-axis DC link voltage reference by performing proportional-integral (PI) control on a difference between the positive sequence d-axis current reference and the measured positive sequence d-axis current;
  a second PI controller configured to output a positive sequence q-axis DC link voltage reference by performing PI control on a difference between the positive q-axis current reference and the measured positive sequence q-axis current; and
  a converting unit configured to output the positive sequence d-axis DC link voltage reference and the positive sequence q-axis DC link voltage reference on a stationary reference frame as a first DC link voltage reference on a synchronous reference frame.

7. The apparatus of claim 1, wherein the second controller comprises a balance controller configured to determine a second DC link voltage reference from a power reference of each phase determined by using a first energy calculated from the average DC link voltage and a second energy calculated from an actual voltage of each phase.

8. The apparatus of claim 7, wherein the second controller further comprises a filter unit configured to determine the second energy by cutting off a second order harmonic component in the system and a second order harmonic component in the load from the measured DC link voltage.

9. The apparatus of claim 8, wherein the filter unit comprises:
  a first band rejection filter configured to cut off the second order harmonic in the system from the measured DC link voltage;
  a second band rejection filter configured to cut off the second order harmonic in the load from the output from the first band rejection filter; and
  a first determining unit configured to determine an energy from the DC link voltage output from the second band rejection filter, in which the second order harmonic components in the system and the load are cut off.

10. The apparatus of claim 7, wherein the balance controller comprises:
  a third PI controller configured to output a negative sequence power reference of each phase by performing PI control on the first energy and the second energy of each phase; and
  a second determining unit configured to determine a second DC link voltage reference from the negative sequence power reference of each phase.

* * * * *